A. RUSS.
AUTOMATIC FORCE FEED LUBRICATOR.
APPLICATION FILED APR. 30, 1920.
1,399,522. Patented Dec. 6, 1921.
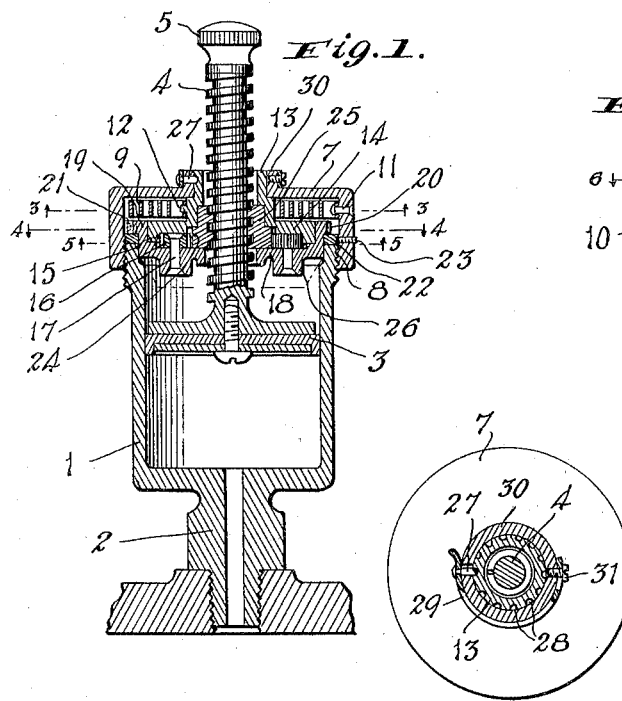
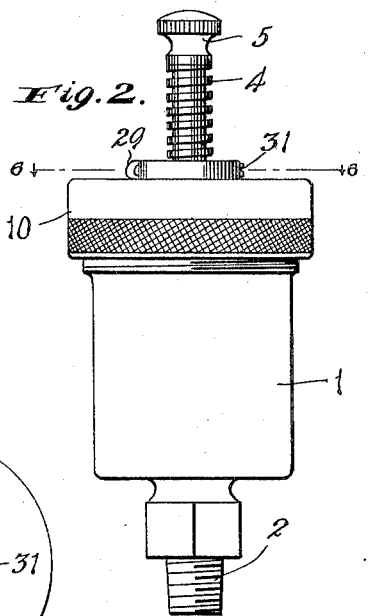
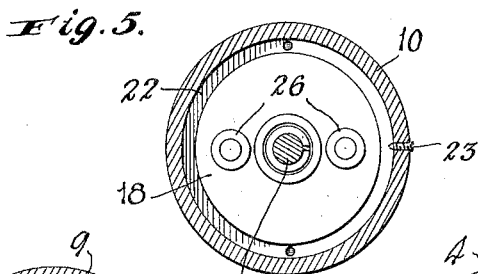
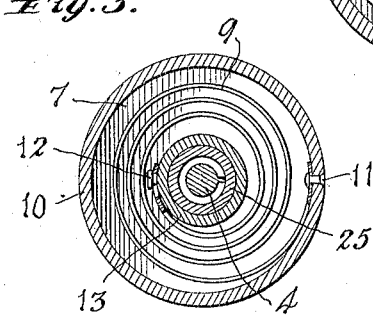
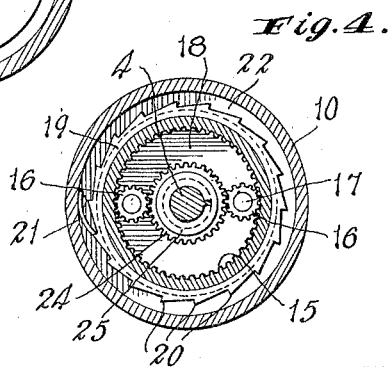
INVENTOR:
August Russ
BY
Everett Rook
ATTORNEYS

UNITED STATES PATENT OFFICE.

AUGUST RUSS, OF BELLEVILLE, NEW JERSEY.

AUTOMATIC FORCE-FEED LUBRICATOR.

1,399,522.   Specification of Letters Patent.   Patented Dec. 6, 1921.

Application filed April 30, 1920. Serial No. 377,806.

*To all whom it may concern:*

Be it known that I, AUGUST RUSS, a citizen of the United States, and a resident of Belleville, in the county of Essex and State of New Jersey, have invented new and useful Improvements in Automatic Force-Feed Lubricators, of which the following is a specification.

This invention relates in general to lubricators and more particularly to a grease or oil cup from which the oil or grease is forcibly and automatically discharged.

The objects of the invention are to provide a device of this character embodying novel features of construction whereby the grease or oil is forcibly discharged by a spring actuated follower or piston; to provide means whereby the follower may be actuated either manually or automatically; to obtain such a grease cup in which the operating mechanism is carried by the cover of the cup so that the cover and operating mechanism can be simultaneously removed from the cup for refilling or adjusting the same; to provide a novel spring motor mechanism for the grease cup for actuating the follower; to provide a construction whereby the spring may be energized by mere relative rotation of the grease cup cover and motor; and to obtain other results and advantages as may be brought out by the following description.

Referring to the accompanying drawing, in which like numerals of reference indicate the same parts throughout the several views, Figure 1 is a vertical sectional view through an automatic force feed grease or oil cup embodying my invention;

Fig. 2 is a side elevation thereof;

Fig. 3 is a horizontal sectional view taken on the line 3—3 of Fig. 1, and looking in the direction of the arrows;

Fig. 4 is a similar view taken on the line 4—4 of Fig. 1;

Fig. 5 is a horizontal sectional view taken on the line 5—5 of Fig. 1, and

Fig. 6 is a similar view taken on the line 6—6 of Fig. 2.

In the specific embodiment of the invention illustrated by the drawings, the numeral 1 designates an oil or grease cup provided with the usual discharge nipple 2 adapted to be screwed into the machine to be lubricated. A piston or follower 3 is slidably fitted within said cup 1 and formed with a threaded stem 4 by means of which the follower is reciprocated to forcibly eject the contents of the cup through the discharge nipple 2. This stem 4 is provided at its outer end with a knob 5 and projects through a central opening 6 in the flanged cover 7 which is screwed at 8 upon the open end of the cup 1 to close the same in the conventional manner.

A coil clock spring 9 is mounted in said cover 7 and has one end thereof fixedly secured to the flange 10 of the cover, as at 11, while the other end thereof is adapted to detachably connect with a stud 12 projecting from the hub 13 of a power transmission disk 14, so that when the spring 9 is energized it will normally rotate said transmission disk 14. The hub 13 of said disk projects loosely through the opening 6 in the cover 7 and slidably receives the stem 4 of the follower 3. The disk 14 carries an annular internal gear 15 which meshes with a pair of pinions 16 journaled by stud shafts 17 upon a ratchet plate 18 which is provided with an upstanding annular flange 19 to rotatably receive the transmission disk 14, the said flange 19 being formed with ratchet teeth 20 engaged by a spring pawl 21 fast upon the flange 10 of the cover 7. This ratchet plate 18 is held in the cover 7 by a bearing ring 22 which is screwed into the threaded flange of the cover and engages under the ratchet on the annular flange 19 of the plate 18, a set screw 23 being provided to maintain the ring in adjusted position. The pinions 16 mesh with a gear 24 on a nut 25 threaded upon the follower stem 4 and rotatably mounted between the transmission disk 14 and the ratchet plate 18 so as to be held against independent movement longitudinally of the stem 4.

In the operation of the device the cover 7 of the cup 1 is removed and the cup filled with a suitable lubricant. The spring 9 is then wound and energized by relative rotation of the cover 7 and the ratchet plate 18, and for the purpose of holding the ratchet plate 18 against rotation in the hand of the operator the said plate may be formed with projections 26 around the pinion shafts 17 to provide finger holds. The transmission disk 14 is held against rotation during the winding operation by a detent pin 27 engaging one of a series of recesses 28 in the hub 12 of the disk, the said detent pin being mounted on a spring strip 29 adjustably mounted on an upstanding boss 30 on the outer end of the cover 7 by a screw and slot connection 31. The inner end of said detent pin 27 is beveled in the direction of forward rotation of the cover 7 so as to slip over the edges of the recesses 28 when the spring is being wound but catch in one of the recesses 28 to prevent relative rotation of the cover and disk 14 in the opposite direction. Backward rotation of the cover 7 is prevented by the spring pawl 21, and after the spring 9 has been completely wound the cover 7 is screwed upon the cup 1, the bearing ring 22 limiting this action and preventing jamming of the spring motor mechanism. The follower 3 is then adjusted manually by rotation of the stem 4 through the nut 25 to proper starting position, after which the detent pin 27 is disengaged from the recess 28, the spring strip 29 being pushed circumferentially of the boss 30 through the medium of the slot and screw connection 31 to hold the pin 27 from engagement with the recess. The spring 9 is then free to unwind and rotate the transmission disk 14 which in turn rotates the pinions 16 and nut 25. The nut being held against longitudinal movement, the follower stem 4 is drawn through the nut inwardly of the cup 1 to cause reciprocation of the follower 3 and forcible ejection of the lubricant through the discharge nipple 2. The lubricant is thus automatically and forcibly fed to the machine being lubricated as needed, and when the cup is emptied it can be refilled, the spring rewound as above described and the operation repeated.

While I have shown one possible embodiment of my invention, adapted for use with a lubricator, it will be obvious that the invention can be used with other kinds of devices for different purposes, and that many modifications and changes can be made in the construction thereof by those skilled in the art without departing from the spirit or scope of the invention, and I do not desire to be limited in the construction of my invention except as required by the following claims when construed in the light of the prior art.

Having thus described the invention, what I claim is,

1. In a device of the character described, the combination of a threaded member, a nut threaded thereon and held against movement longitudinally of said first-mentioned member, said nut having gear teeth thereon, a pinion meshing with said gear teeth, and means for rotating said pinion.

2. In a device of the character described, the combination of a threaded member, a nut threaded thereon and held against movement longitudinally of said first-mentioned member, said nut having gear teeth thereon, a pinion meshing with said gear teeth, a second gear meshing with said pinion, and means for rotating said second-mentioned gear.

3. In a device of the character described, the combination of a threaded member, a nut threaded thereon and held against movement longitudinally of said first-mentioned member, said nut having gear teeth thereon, a pinion meshing with said gear teeth, means for preventing bodily rotation of said pinion around said gear on the nut, a second gear meshing with said pinion, and means for rotating said second-mentioned gear.

4. In a device of the character described, the combination of a fixed member, a nut rotatably mounted thereon and formed with gear teeth, a member threaded through said nut and movable longitudinally thereof, a pinion meshing with said gear teeth, means for preventing bodily rotation of said pinion around said gear on the nut, a spring having one end thereof connected to said fixed member and the other end thereof connected with said pinion, and means for winding said spring.

5. In a device of the character described, the combination of a fixed member, a nut rotatably mounted thereon and formed with gear teeth, a member threaded through said nut and movable longitudinally thereof, a pinion supporting member having a pinion mounted thereon and meshing with said gear teeth, a spring having one end thereof fast to said fixed member and the other end thereof connected to said pinion, relative rotation in one direction of said fixed member and said pinion supporting member serving to wind said spring, and means for preventing relative rotation with said pinion supporting member and said fixed member in the opposite direction.

6. In a device of the character described, the combination of a fixed member, a nut rotatably mounted thereon and formed with gear teeth, a member threaded through said nut and movable longitudinally thereof, a pinion supporting member having a pinion mounted thereon and meshing with said gear teeth, a second gear meshing with said pinion, a spring having one end thereof fast to said fixed member and the other end thereof connected to said second-mentioned gear, relative rotation of said fixed member and said pinion supporting member in one direction serving to wind said spring, means for preventing relative rotation of said fixed member and said pinion supporting member in the opposite direction, and means for preventing relative rotation of said second-mentioned gear and said fixed member in one direction.

7. The combination of a receptacle, a cover thereon, a follower for ejecting the contents of said receptacle and having a threaded stem, a nut revolubly mounted in said cover threaded on said stem and held against longitudinal movement therewith, said nut being formed with gear teeth, a pinion mounted in said cover and meshing with said gear teeth on the nut, and means for rotating said pinion.

8. The combination of a receptacle, a cover thereon, a follower for ejecting the contents of said receptacle and having a threaded stem, a nut revolubly mounted in said cover threaded on said stem and held against longitudinal movement therewith, said nut being formed with gear teeth, a pinion mounted in said cover and meshing with said gear teeth on the nut, and a spiral spring having one end thereof connected to said cover and the other end connected with said pinion to rotate the same.

9. The combination of a receptacle, a cover thereon, a follower for ejecting the contents of said receptacle and having a threaded stem, a nut revolubly mounted in said cover threaded on said stem and held against longitudinal movement therewith, said nut being formed with gear teeth, a pinion mounted in said cover and meshing with said gear teeth on the nut, a gear revolubly mounted in said cover and meshing with said pinion, and means for rotating said gear.

10. The combination of a receptacle, a cover thereon, a follower for ejecting the contents of said receptacle and having a threaded stem, a nut revolubly mounted in said cover threaded on said stem and held against longitudinal movement therewith, said nut being formed with gear teeth, a pinion mounted in said cover and meshing with said gear teeth on the nut, a gear revolubly mounted in said cover and meshing with said pinion, and a spring having one end connected to said cover and the other end connected to said gear for rotating the same.

11. The combination of a receptacle, a cover thereon, a follower for ejecting the contents of said receptacle and having a threaded stem, a nut revolubly mounted in said cover threaded on said stem and held against longitudinal movement therewith, said nut being formed with gear teeth, a pinion support revolubly mounted in said cover, a pinion mounted on said support and meshing with said gear teeth, a gear revoluble in said cover and meshing with said pinion, a spring having one end connected to said cover and the other end connected to said gear to rotate the same, relative rotation of said cover and said pinion support in one direction winding said spring, and means for preventing relative rotation of said cover and said pinion support in the opposite direction.

AUGUST RUSS.